ively discon-
United States Patent

Tippett et al.

[11] 3,919,617
[45] Nov. 11, 1975

[54] BATTERY CHARGE CONTROL CIRCUIT
[75] Inventors: Daniel R. Tippett, Fort Worth; David C. Fricker, Lorene, both of Tex.
[73] Assignee: ECC Corporation, Euless, Tex.
[22] Filed: June 3, 1974
[21] Appl. No.: 475,813

[52] U.S. Cl. .................. 320/39; 320/13; 320/40; 320/DIG. 2
[51] Int. Cl.² ........................................ H02J 7/10
[58] Field of Search ........... 320/39, 40, 19, DIG. 2, 320/DIG. 1, 22–24; 307/66

[56] References Cited
UNITED STATES PATENTS

| | | | |
|---|---|---|---|
| 3,114,095 | 12/1963 | Palmer | 307/66 X |
| 3,443,191 | 5/1969 | Medlar | 320/24 |
| 3,531,706 | 9/1970 | Mullersman | 320/22 X |

*Primary Examiner*—R. N. Envall, Jr.
*Assistant Examiner*—Robert J. Hickey
*Attorney, Agent, or Firm*—Giles C. Clegg, Jr.

[57] ABSTRACT

A circuit for controlling the application of current from a current source to a battery and for preventing drain of current from the battery to sensing circuitry when the current source is not generating current. The circuit includes current control circuitry interconnecting the current source and the battery, this circuitry being responsive to control signals from the sensing circuitry for applying current from the current source to the battery. When the battery voltage is below a predetermined level, the sensing circuitry applies a control signal to the current control circuitry to enable it to apply current to the battery, and when the battery voltage is above that predetermined level, no control signal is applied to the current control circuitry. Switch circuitry is interposed between the battery and the sensing circuitry and is responsive to current from the current source for applying at least a portion of the voltage from the battery to the sensing circuitry. When no current is being developed by the current source, the switch circuit effectively disconnects the battery from the sensing circuitry. A potentiometer interconnects the switch circuitry with the sensing circuitry to enable variation of the battery voltage level at which a control signal is applied by the sensing circuitry to the current control circuitry.

5 Claims, 1 Drawing Figure

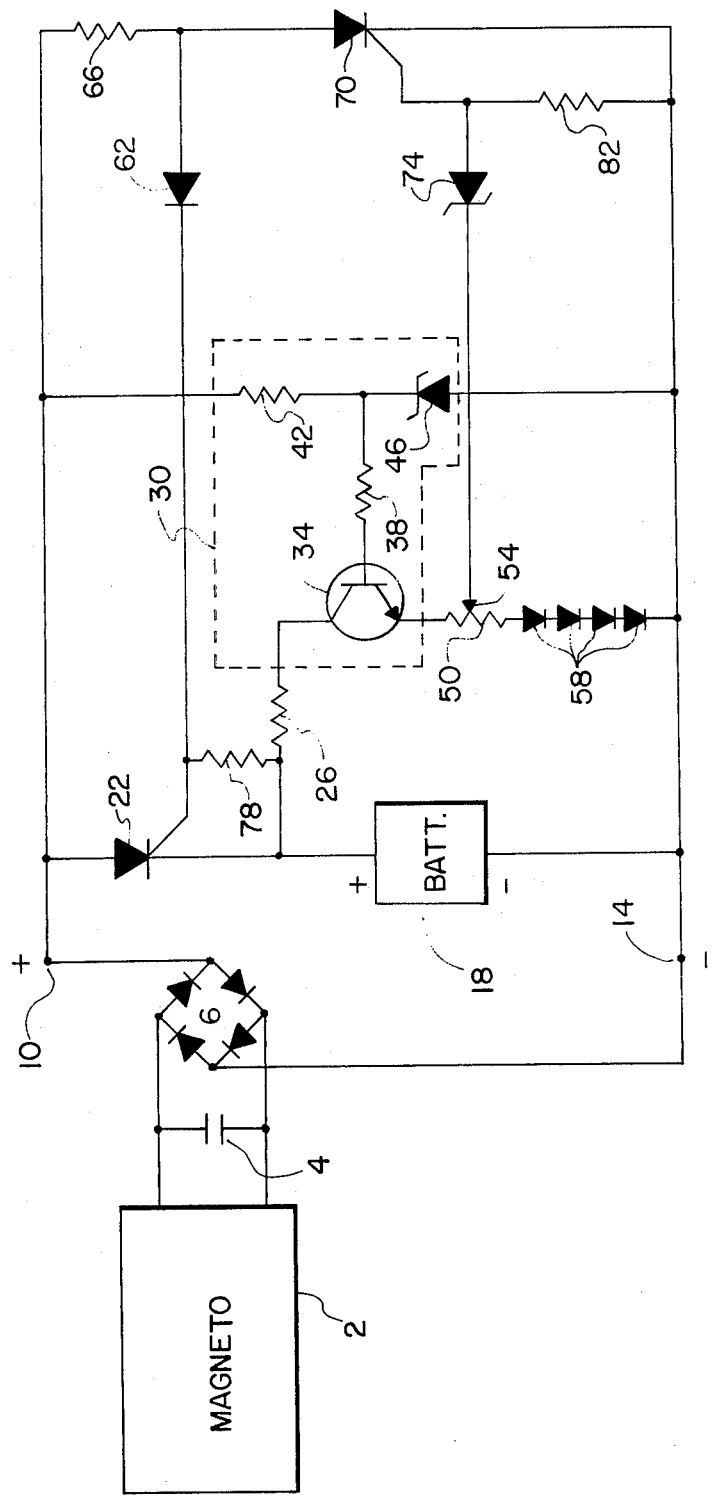

BATTERY CHARGE CONTROL CIRCUIT

BACKGROUND OF THE INVENTION

This invention relates to circuitry for controlling the application of current from a current source to a battery and more particularly to circuitry for preventing current drain from the battery when the current source is generating no output current.

Circuits for controlling the charging of batteries from a current source typically include sensing circuitry for sensing the voltage output of the battery, and current control circuitry interconnecting the current source with the battery and responsive to the sensing circuitry for applying current from the current source to the battery. One problem with this is that when the current source is not generating current to charge the battery, the sensing circuitry is still coupled to the battery and may continue to draw an undesirable amount of current tending to discharge the battery.

It is an object of the present invention to provide a battery charge control circuit in which excessive drain of current from the battery is inhibited when no current is being generated by the current source which charges the battery.

It is another object of the present invention to provide such a control circuit which includes circuitry for varying the amount of voltage applied from the battery to certain battery voltage sensing circuitry.

It is still another object of the present invention to provide such a control circuit which includes solid state components and temperature compensating circuitry for such solid state components.

SUMMARY OF THE INVENTION

The above and other objects of the present invention are realized in a battery charge control circuit which includes current control circuitry interconnecting a current source and a battery and responsive to a control signal for applying current from the current source to the battery, sensing circuitry responsive to the application of voltage thereto for applying a control signal to the current control circuitry, and switch circuitry responsive to the generation of current by the current source for applying at least a portion of the voltage output of the battery to the sensing circuitry. If the battery voltage level is below a predetermined level, the sensing circuitry applies a control signal to the current control circuitry and if the battery voltage is above the predetermined level, the sensing circuitry inhibits the application of the control signal to the current control circuitry. When the current source generates no current, the switch circuitry effectively disconnects the sensing circuitry from the battery so that current drain on the battery is minimized.

DESCRIPTION OF THE DRAWING

The above and other objects and advantages of the present invention will become more apparent from the following detailed description presented in connection with the accompanying drawing which shows a circuit for controlling the application of current from a current source to a battery made in accordance with the principles of the present invention.

DETAILED DESCRIPTION

The circuit of the drawing is especially adapted for use with electrical systems having permanent magnet generators or magnetoes. Vehicles such as snowmobiles and motorcycles typically have such electrical systems.

The arrangement shown in the drawing includes a magneto 2 whose output terminals are connected to diagonally opposite nodes of a full-wave diode bridge rectifier 6. The other two diagonally opposite nodes of the bridge 6 are connected to a respective one of the terminals 10 and 14. The terminals 10 and 14 can be considered the positive and negative terminals respectively of a current source which comprises the magneto 2 and the diode bridge 6. The designation of terminal 10 as the positive terminal and terminal 14 as the negative terminal is apparent from an examination of the orientation of the diodes of the diode bridge 6.

A battery 18 is connected in series with the power electrodes of a triode switch 22 which, in the illustrative embodiment, is a silicon-controlled rectifier (SCR). The positive terminal of the battery is connected to the cathode of the SCR 22 whereas the negative terminal of the battery is connected to terminal 14. The anode of the SCR 22 is connected to the terminal 10. A capacitor 4 is provided to prevent rapid voltage changes from being applied across the SCR 22 to thereby prevent false "turn on" of the SCR.

A resistor 66 is connected in series with the power electrodes of a second triode switch 70 which is also an SCR, and this series arrangement interconnects terminals 10 and 14. The control electrode of the SCR 22 is connected via a diode 62 to the junction of the resistor 66 and the SCR 70. The junction between the control electrode of the SCR 22 and the diode 62 is further connected via a resistor 78 to the positive terminal of the battery 18.

The junction between the SCR 22 and the battery 18 is connected via a resistor 26 to switch circuitry 30. The switch circuitry 30 is also connected to the terminal 10 and to the terminal 14. One terminal of a potentiometer 50 is connected to the switch circuitry 30 and the other terminal of the potentiometer is connected via a diode chain 58 to the terminal 14. The tap 54 of the potentiometer is connected via a Zener diode 74 to the control electrode of the SCR 70. The junction between the Zener diode 74 and the control electrode of the SCR 70 is connected via a resistor 82 to the terminal 14.

The switch circuitry 30 includes a transistor 34 whose collector is connected to the resistor 26, whose emitter is connected to the potentiometer 50, and whose base is connected via a resistor 38 to the junction between a resistor 42 and a Zener diode 46. The resistor 42 and Zener diode 46 are connected in series between the terminals 10 and 14. The operation of the circuit of the drawing will now be described.

The magneto 2 generates an alternating current which is rectified by the diode bridge 6 and applied to the rest of the circuitry shown in the drawing. Current is thus applied via the resistor 66 and the diode 62 to the control electrode of the SCR 22 (assuming that the SCR 70 is nonconductive). The current applied to the gate electrode of the SCR 22 renders the SCR conductive so that current may flow therethrough from the terminal 10 to the battery 18 to commence charging the battery.

Current is also applied from the terminal 10 via the resistors 42 and 38 to the base of the transistor 34 to turn on the transistor. With the transistor 34 turned on, voltage is applied from the junction between the SCR 22 and the battery 18 via the resistor 26 and transistor 34 to the potentiometer 50. A portion of this voltage is applied via the tap 54 of the potentiometer to the Zener diode 74. The voltage at the junction between the SCR 22 and the battery 18 consists of the voltage generated by the battery 18 plus the voltage contributed by the magneto 2 via the diode bridge 6 and SCR 22.

As the charging of the battery continues, the battery voltage will reach a level which, when added to the voltage contribution from the magneto 2, will cause the Zener diode 74 to breakover to trigger the SCR 70 into a conductive condition. With the SCR 70 rendered conductive, current applied to the resistor 66 from the terminal 10 is conducted via the SCR 70 to the terminal 14 so that current is effectively removed from the control electrode of the SCR 22. As the battery voltage increases due to charging, the breakover of the Zener diode 74 will occur earlier and earlier in the half cycle (of the output signal from the magneto 2), until at some point this breakover will cause the SCR 70 to become conductive before the SCR 22 is rendered conductive; and this will prevent the SCR 22 from becoming conductive for that half cycle. Of course, if the SCR 22 is prevented from becoming conductive, no current is applied to charge the battery 18. Thus, if the battery voltage is above a predetermined level, the Zener diode 74 will breakover in each half cycle causing the SCR 70 to become conductive before the SCR 22 thereby preventing charging of the battery. If the battery voltage is below this predetermined level, the SCR 22 is rendered conductive before the SCR 70, and charging current is applied to the battery.

The switch circuitry 30 operates to effectively disconnect the battery 18 from the potentiometer 50, a diode chain 58, Zener diode 74 and SCR 70 (the latter two components comprising what might be referred to as sensing circuitry) when the magneto 2 is generating no output current. This is clear from an examination of the drawing since, if no current is being applied from the terminal 10 via resistors 42 and 38 to the base of the transistor 34, the transistor 34 will be turned off to prevent conduction of current or application of voltage from the junction of the SCR 22 and the battery 18 to the potentiometer 50. Thus, by providing the switch circuitry 30, current drain from the battery 18 to the potentiometer 50 and sensing circuitry is prevented while the magneto 2 is generating no output current.

Other embodiments of the switch circuitry 30 could also be utilized to "disconnect" the battery from the potentiometer 50—such embodiments including relay circuitry for example.

The tap 54 of the potentiometer 50 may be manually adjusted to supply voltage of different magnitudes to the Zener diode 74. Thus, by appropriately setting the tap of the potentiometer 50, the battery voltage level at which the charging of the battery is terminated can be selected. If the tap 54 is moved upwardly, for example, then more voltage is supplied to the Zener diode 74 to cause the diode to breakover earlier in the charging process so that the charging process is terminated at a lower battery voltage level. Conversely, if the tap 54 is moved downwardly, less voltage is supplied to the Zener diode 74 and the charging process is terminated later in the charging process when the battery voltage is higher.

The diode chain 58 is included to provide temperature compensation for the sensing circuitry comprising the Zener diode 74 and the SCR 70. It is well-known for SCR's that as the temperature decreases, the current required to trigger the SCR increases. Thus, if the environmental temperature of the circuit of the drawing decreased, more current would be required to trigger SCR 70. To compensate for this, it is necessary that as the temperature decreases, the voltage at the tap 54 of the potentiometer increase. The diode chain 58 is placed in series with the potentiometer 50 so that as the temperature decreases, the voltage drop across the diode chain 58 increases (a characteristic of diodes) to cause a corresponding increase of the voltage at the tap 54 of the potentiometer 50. The number of diodes used in the diode chain may be selected to provide the best compensation for the particular SCR 70 used.

Zener diode 46 together with resistors 42 and 38 limit the current supplied to the base of transistor 34 to a safe level. Resistors 78 and 82 are provided to improve the holding current and turn off time characteristics and the immunity to false turn on (caused by rapid voltage changes across the SCR's) of SCR's 22 and 70 respectively. Resistor 66 is simply a current limiting resistor.

It is to be understood that the above-described circuit is only illustrative of the principles of the present invention. Other circuits may be described by those skilled in the art without departing from the spirit and scope of the invention and the appended claims are intended to cover all such other circuits.

What is claimed is:

1. A circuit for controlling the application of current from a source of full-wave rectified direct current to a battery, said current source including a positive terminal and a negative terminal, said circuit comprising:

a first triode switch having first and second power electrodes and a control electrode, said power electrodes being connected in series between the positive terminal of said current source and the positive terminal of said battery, said first triode switch being responsive to a control signal applied to the control electrode thereof for conducting current from said current source to said battery;

a second triode switch having first and second power electrodes and a control electrode, said power electrodes being connected in series between the positive and negative terminals of said current source, said first power electrode of said second triode switch being further coupled to the control electrode of said first triode switch, said second triode switch being responsive to a control signal applied to the control electrode thereof for controlling the control signal applied to the control electrode of said first triode switch;

a Zener diode coupled to the control electrode of said second triode switch, and switch means coupled to positive terminal of said battery to the positive terminal of said current source, and to the Zener diode, and responsive to current from said current source for applying at least a portion of the voltage output of said battery to said Zener diode during each half cycle of source current to establish the control signal applied to said second triode switch.

2. The circuit of claim 1 wherein said switch means comprises an N-P-N transistor whose collector is coupled to the positive terminal of said battery, whose emitter is coupled to said Zener diode, and whose base is coupled to the positive terminal of said current source.

3. The circuit of claim 1 further including a potentiometer interconnecting said switch means with said Zener diode, the tap of said potentiometer being connected to the Zener diode, one terminal of the potentiometer being connected to said switch means and the other terminal of said potentiometer being coupled to the negative terminal of said current source.

4. The circuit of claim 3 further including one or more diodes interconnecting said other terminal of said potentiometer to the negative terminal of said current source.

5. A circuit according to claim 1 and including a diode for coupling said first power electrode of said second triode switch to said control electrode of said first triode switch.

* * * * *